United States Patent Office 3,340,625
Patented Sept. 12, 1967

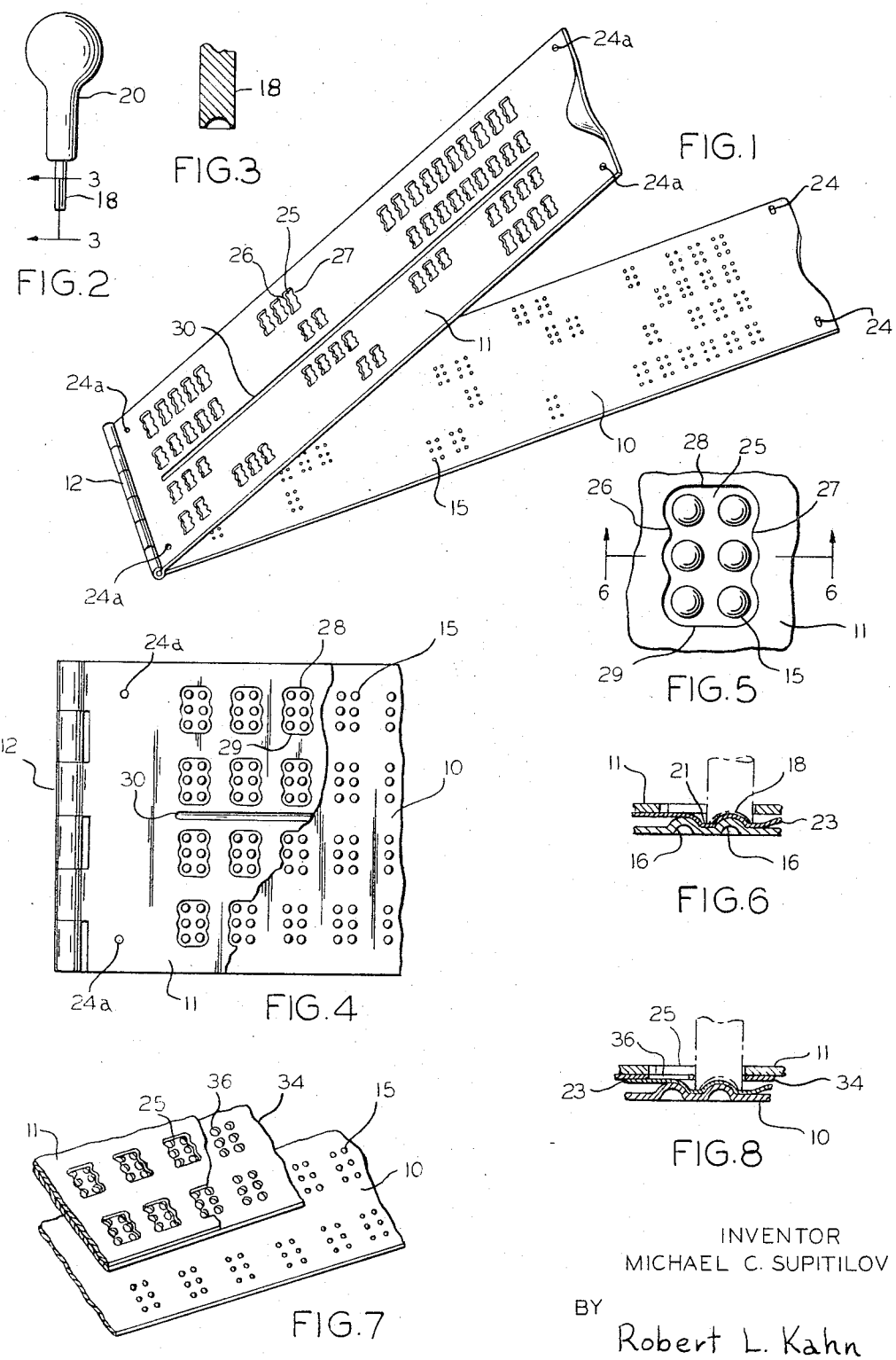

3,340,625
BRAILLE SLATE
Michael C. Supitilov, St. Charles, Ill., assignor to Dukane Corporation, St. Charles, Ill., a corporation of Illinois
Filed July 9, 1965, Ser. No. 470,856
2 Claims. (Cl. 35—38)

ABSTRACT OF THE DISCLOSURE

A Braille slate is provided wherein a user creates upwardly disposed embossing dots in paper. The slate construction has a base plate containing embossings grouped in cells, a top plate containing windows exposing a cell of six dots per window and a web plate portion of thin rigid material having enlarged apertures registering with individual dot embossings on the base plate. The web apertures together with the cover plate cooperate so that a "stylus" (having a recess instead of a point) can emboss paper disposed between the web portion and the base plate when the "stylus" is perpendicular to the plate. This prevents improper embossing of the paper. The web portion and top plate may be combined into one.

---

This invention relates to a Braille slate and has as a principal object to provide a simple, efficient and economical slate which may be used by the blind in making notes and for all purposes for which a conventional slate is used.

The Braille system for communication among the blind is based upon the cell as a unit. A cell consists of an array of six dot or embossing positions arranged in two vertical columns of three disposed in parallel offset relation. In accordance with convention, the embossing positions are generally numbered from 1 to 3 in the left hand column and from 4 to 6 in the right hand column.

Due to limitations in tactile resolution, the dimensions of a cell have been standardized to a minimum of about ¼" by about $10/64$". The actual standard dot arrangement calls for .090" between adjacent dots within a cell both vertically and horizontally; .250" between horizontally adjacent dots of two adjacent cells in the same Braille line; and .400" between vertically adjacent dots of two vertically adjacent cells of two adjacent Braille lines. Generally, the standard Braille arrangement of cells in a book calls for about 28 cells to a line with ample room for margins.

The dot dimensions on Braille paper provide for a height of about .015" to about .020" for the embossment and about .050"–.070" for the transverse dimension (diameter of a dot along the plane of the flat paper). The creation of embossed dots on pages for Braille reading makes it desirable to use certain jute papers or yieldable plastic sheets.

While Braille as a medium for the blind was adopted some time in 1829, there has been very little, if any, improvement in the underlying theory of operation and the mechanical structure of Braille slates. As is well-known, a Braille slate is a device which permits a blind person to make his own Braille characters on suitable paper. Such slates consist of three principal parts, a die plate, a guide plate and a stylus. The mode of operation of conventional slates involves initially the creation of depressions rather than projections in the paper. The die plate carries any desired number of Braille cells with each cell having a complete six dot pattern of depressions. As a rule, a slate has a standard number of cells arranged to form a line and has four lines of cells to reduce the frequency of moving the paper in the slate. The guide plate is generally hinged to the die plate at one edge, usually the left hand edge for Occidental languages. The guide plate contains a number of cell windows to correspond with and adapted to register with the die cells. The paper to be used is clamped between the guide plate and die plate by suitable registering gripping pins and embossings. The stylus has a rounded tip which can be guided by the guide plate window wall to be positioned over a particular dot in a particular cell for operating on the paper.

The above slate arrangement, which has been current for many years, operates on the principle that the embossing pattern as considered from above the slate is initially the mirror image of the dot pattern in a cell to be "read." This is due to the fact that the stylus forces the paper down into the dot depression in the die plate to create a dot in the paper which, as viewed by the operator during the use of the slate, is a depression rather than an embossing. This mode of operation creates serious operational difficulties.

Fundamentally in using a conventional slate, a blind person must not only know Braille characters in the usual pattern but must also be able to learn and use mirror image dot arrangements for the same Braille characters. This not only creates difficulties for a beginner but can also be a fertile source of confusion. As an example, a cell having one dot in No. 1 position and standing for $a$ (or in certain instances numeral 1) is the mirror image of a cell having one dot in No. 4 position which represents an accent sign. Dots 1, 4 and 5 standing for $d$ is the mirror image of the Braille character representing $f$. In fact, if one goes through the entire alphabet and abbreviations, it will be found that there are many instances where two cells have mirror image dot arrangements and representing entirely different items. Even an experienced Braille user can have considerable difficulty in writing and transcribing material on a conventional slate because of the mirror image factor. Braille normal reading in English is from left to right. But Braille slate writing reverses this from right to left.

In addition to the above, the paper in a conventional slate is reversed insofar as the two faces or sides of the paper are concerned. This makes it difficult and inconvenient to read while the paper is in the slate and, in most instances, requires complete removal from a conventional slate during reading.

This reversal of cell structures as well as line reversal from left to right creates a very serious problem for students in making notes during lectures. If a bound notebook is used, then the difficulties of using a conventional slate, first with the binding on the left and when reading with the binding upon the right, creates great confusion during the taking of notes or after the notes have been completed. In fact, a conventional slate makes it practically impossible to use notebooks containing bound sheets.

Looseleaf notebooks are also a fertile cause of confusion with conventional slates. With such slates care must be taken to have the binding or ring edge on the right side during the note taking and, of course, when reading the bound or ring edge will have to be on the left side. The paper becomes torn during handling.

As a result of the above difficulties in using a conventional slate, a serious impediment to the use of such a slate by one who is either young or old exists. In either case, the mental effort required for carrying the mirror images of the dot arrangement in mind and making the necessary transpositions and adjustments for using the slate and for later reading the paper embossed in a slate is beyond the abilities of such people.

While various countries in the world have taken extraordinary steps to ease the lot of the blind—and this includes the United States—the art has not made the use of a slate by a blind person easier since the introduction of the first slate many years past. In the United States, the Library of Congress has been charged by law with administering programs for aiding the blind, such programs including developing new procedures and devices. In particular, the manufacture of many devices, including slates to be used by the blind, has been subsidized by the United States Government with a view to rendering such improvements available to the blind at moderate prices. Presently there are a number of not-for-profit companies which direct their commercial efforts toward providing various devices including slates and the like for use by the blind.

As an example, the American Printing House for the Blind located in Louisville, Kentucky, provides a so-called Hoff Aid which is an upward writing slate. This device has a die plate upon which a single line of 30 space 6-dot Braille cells have been stamped with the dots pointing upward. Mounted over the frame is a round steel bar along which a movable die box can travel over the raised line of dots. The mechanical arrangement is such that the die box can be positioned along the line of cells so that the die box will be disposed over any selected cell. The die box is filled with six inverted, conically shaped caps the size of Braille dots, which are held in place by small springs and are arranged to fit down over the Braille dots in the die plate when the caps are depressed. A conventional Braille stylus is used to position the caps down over the raised dots, with the paper between, to form Braille characters. Such an item listed under Catalogue No. 1–0051 has too limited a use and does not appear to be popular for practical everyday purposes. In fact, it is clear that the actual use of a stylus on such an arrangement requires considerable experience and creates problems of use while eliminating the problem involved in mirror imagery.

In particular, the use of such a slate is quite exhausting due to the physical effort required in overcoming the spring load; this being particularly bad for children. Irrespective of whether a user is young or old, the Hoff Aid is slow and involves much more time than a conventional slate insofar as use is concerned.

In addition to the Hoff Aid, there is a so-called Swail Dot Inverter also sold by the American Printing House for the Blind. This is designed to provide upward embossing of single dots by hand. The inverter must be used in conjunction with a rubber pad upon which the Braille embossings are to be created. This device is principally used for making line drawings.

In an attempt to mitigate some of the shortcomings of the regular slate, a so-called Brown Slate is available. This is a refinement of the regulation pocket slate to which has been added an extra frame to hold the pins for mounting the paper. This makes it possible to drop open the bottom part of the conventional slate guide plate containing the reverse embossings or indentations and permit reading of the paper without taking the paper out of the slate.

The present invention provides for an improved slate wherein the dot pattern to be created on the paper is exactly the same as the pattern corresponding to the character or abbreviation which is recognized for that particular pattern. In other words, the new slate hereinafter described does not involve any mirror image transposition of Braille characters. In addition, the new slate makes it convenient to read a transcription from left to right and without removing the paper from the upturned slate. In its fundamental form, the invention involved in the new slate provides for a simple reversal of the stylus and depressed dot in the conventional slate die plate. In the new Braille slate, the die plate has conventional cells arranged in any desired number and any desired lines. Each cell has its complement of dots upwardly directed, this being obtained by having the die plate material either of metal or plastic embossed to provide dots. Cooperating with a die plate in the new slate is a guide plate of conventional construction with the exception that the windows outlining a cell are somewhat larger than in a conventional slate. This provides sufficient clearance at the window borders in the guide plate so that what would ordinarily be a stylus but is in reality a small socket can be properly positioned in the die plate to register therewith over a dot embossing.

Between the slate plates the paper will be located in conventional fashion. To prevent displacement of paper or accidental embossing thereof, suitable ribs and nonfunctional (as far as reading is concerned) embossings may be provided for cooperating with inactive portions of the paper. The socket resembles a stylus in that the user grips a handle carrying the socket. The socket during embossing of the paper should be substantially perpendicular to the slate so that there will be no lateral misalignment (parallax effect) of the embossings on the paper. If desired, the new slate can have an intermediate socket guide plate containing circular apertures to register with the dot-forming (in the paper) embossings on the base plate. Such a socket guide will be located above the paper and below the guide plate and will prevent the socket from embossing the paper unless the socket is in proper position to register with a base plate embossing and shape the paper.

In order that the invention may be fully disclosed, reference will now be made to the drawing wherein FIGURE 1 is a perspective view of a slate embodying the present invention.

FIGURE 2 is a view in elevation of a "stylus" for use with a new slate.

FIGURE 3 is an enlarged sectional detail on lines 3—3 of FIGURE 2.

FIGURE 4 is on enlarged plan view of a portion of the slate illustrated in FIGURE 1.

FIGURE 5 is a plan view on an enlarged scale of one cell of the slate of FIGURES 1 and 4.

FIGURE 6 is a section on line 6—6 of FIGURE 5, the operating socket portion of the "stylus" being shown in dotted lines.

FIGURE 7 is a detail of a modified slate embodying the present invention.

FIGURE 8 is a sectional detail on an enlarged scale generally similar to FIGURE 6 but illustrating the modified structure of FIGURE 7.

Referring first to FIGURES 1 to 6 inclusive, a slate embodying the present invention has base plate 10 and guide plate 11 these two plates being hinged at one edge of each as, for example, the left edge with the hinge being of conventional construction. Either or both of the base plate and guide plate may be of plastic or metal stamp or embossed as may be desirable for providing the structure to be described. The thickness and dimensions of each of these two plates may follow conventional practice. As illustrated in FIGURE 1, the slate is long enough (across the width of paper to be embossed) so that a conventional number of cells may be provided.

As has been previously indicated, many slates now in use provide four lines of cells. Since all the cells are similar in construction, it is necessary to describe only one in detail. Thus, for example, referring to FIGURES 5 and 6 of the drawings, cell 15 on base plate 10 is provided with the standard arrangement of dots except that each dot consists of dome 16 extending upwardly from base plate 10 as seen in FIGURES 1 and 4. Dome 16, insofar as dimensions are concerned, follows conventional practice. Thus, for example, the height of a dome or embossing 16 may be between about .015 inch and .020 inch, this being measured from the top surface of base plate 10. The spacing between adjacent embossings or domes will follow standard practice. These dimensions are given for a slate whose size corresponds to a conventional slate to produce conventionally sized embossed cells in standard sheets of paper as used in such slates.

The spacing between adjacent domes or embossings 16 as illustrated in FIGURE 6 of the drawing is sufficient to accommodate the thickness of socket portion 18 of "stylus" 20.

Socket portion 18 is deep enough from edge 21 of the "stylus" so that embossing or dome 16 when covered with Braille paper 23 can easily be accommodated by the socket. It is understood that "stylus" edge portion 21 is circular about the longitudinal axis of the "stylus" and that the thickness of edge portion 21 will be just enough to permit the socket to seat over an embossing 16 and shape paper 23 as illustrated in FIGURE 6. Socket edge portion 21 bears down against paper 23 to press the paper in a circular ring about a dome and thus prevents one embossing in the paper from mutilating or disturbing the shape of an adjacent embossing.

Socket portion 18 of the stylus and edge portion 21 are both preferably made of hardened steel or other hard material for withstanding wear.

The depth of socket portion 18 of the stylus is just sufficient to permit the socket to emboss the paper to provide a satisfactory and readable dot.

The slate illustrated in the drawings is provided with conventional pins 24 at the four corners of the slate for piercing paper 23 and retaining the same firmly in the slate. Pins 24 cooperate with apertures 24a in the guide plate, this arrangement being well known. In addition, either guide plate 11 or base plate 10 can be provided with embossed ribs 30 located in suitable parts of the slate to reinforce the base and guide plates and to protect against accidental embossing of the paper.

Cooperating with base plate 10 and the cells therein is guide plate 11 provided with windows 25. Each window 25 registers with a cell so that when plates 10 and 11 are together as illustrated in FIGURE 4, cell 15 will register with the corresponding window 25 and will permit access of stylus 20 to the embossings or domes 16 in plate 10. It should be noted that sides 26 and 27 of a window are scalloped so that the sides of the windows conform to the circular shape of the stylus shank. Sides 26 and 27 and top and bottom edges 28 and 29 of a window will have to be spaced with respect to embossings 16 in a cell so that edge portion 21 of a stylus can clear the sides of the window. The scalloped pattern of window sides 26 and 27 is conventional in such slates. However, in a slate embodying the present invention, the separation between the opposite sides of a window will have to be increased somewhat above the corresponding separation in conventional slates due to the fact that the stylus in the new slate has a larger outer diameter than a conventional pointed tip.

Unless a socket on a stylus comes down against the paper perpendicular to the plane of base plate 10, there may be some misalignment or even imperfect embossing of paper 23. In order to aid a user of the new slate to apply the stylus substantially perpendicular to the plane of the slate plates, the modification illustrated in FIGURES 7 and 8 can be provided. In this modified slate, apertured web plate 34 is disposed between base plate 10 and guide plate 11. Web plate 34 must be disposed so that its position relative to the rest of the slate insofar as registration is concerned will remain fixed. Web plate 34 is a thin plate of metal or hard plastic. The thickness of web plate 34 is somewhere between the thickness of the bottom and top plates 10 and 11 and will be dictated in part by the strength of material used.

Web plate 34 is provided with circular apertures 36 following cell dot pattern which will register with domes or embossings 16 of base plate 10 when the web plate is superimposed upon plate 10. Each group of apertures 36 corresponding to a cell will also register with each window 25 of the guide plate. The size of the diameter of each aperture 36 in web plate 34 must be greater than the diameter of embossing 16 in the base plate, the difference in the two diameters being enough to accommodate the thickness of edge portion 21 of socket portion 18. It is desirable that adjacent apertures 36 in web plate 34 have web plate material between them. It may therefore be necessary to reduce the thickness of edge portion 21 from that illustrated in FIGURE 6 where the edge portion occupies the intervening space between adjacent embossings 16. Or it may be desirable to reduce the diameter of embossing 16 from what is presently regarded as standard to increase the space between adjacent embossings 16 without making the edge thickness of portion 21 of the socket too small. It is also possible in the event that the diameter of embossings 16 is to be retained to have the spacing between adjacent cell dot embossings increased. This will increase the over-all dimensions of the dots making up a cell.

It is clear from FIGURE 8, that the end portion of stylus socket 18 will have to be inserted quite straight in order to pass through web plate apertures 36 to provide paper embossings. The scalloped shape of sides 26 and 27 of a guide plate window will also be dimensioned so that the thickness of guide plate 11 and web plate 34 will function to guide the stylus socket straight down into proper position for embossing paper 23 correctly.

Web plate 34 may be permanently attached to guide plate 11 as by riveting, cementing or the like. It is also possible to integrate these two by molding a composite guide plate out of plastic wherein the windows in the guide plate and the circular apertures in the web plate are provided. Such an arrangement will result in a mechanically simple structure having a base plate with embossing domes or dots and a composite guide plate having windows and circular apertures.

It is evident that a slate embodying any form of the present invention will permit the use by a student when taking notes of a looseleaf or even bound leaf notebook. The notebook will at all times have the binding or ring edge at the left during the taking of notes and during the reading thereof. It is, of course, understood that only one face or side of the Braille paper will be used.

With the new slate, a person using a notebook will not be required to remove sheets from the notebook or from the slate for reading, the hinge being to the right.

The guiding effect of apertures 36 in web 34 may be duplicated more or less by making guide plate 11 of great enough thickness so that with a little practice, a user will be guided and can operate a stylus to be substantially perpendicular to the plane of the paper. The slate can be provided with upwardly directed embossings on the guide plate located between lines of cells for indicating purposes.

What is claimed is:

1. In a Braille slate of the type having a flat base plate and a superimposed flat guide plate, the base plate having embossed regions corresponding to dots of cells and the guide plate having at least one window, with such window registering with a group of embossings making up a cell with embossing being accomplished by means of a stylus, the improvement which consists in having rounded dome-shaped embossings in the base plate extend upwardly toward the superimposed guide plate, the guide plate having such window dimensioned so that when the guide plate is over the base plate the boundaries of such window lie beyond the outer edges of a cell as viewed in plan, and a "stylus" having a socket portion dimensioned to cooperate with a cell embossing to create an upwardly disposed embossing in paper used with said slate, said socket portion having an annular edge, and a web plate disposed between the guide and base plates, said web plate having apertures registering with cell dots, such window and web plate apertures being dimensioned to accommodate the socket portion when moved through a window in the guide plate generally perpendicularly to the plane thereof and pressed against a cell dot embossing, said guide and web plates, in slate operating condition, having flat contacting faces in the regions about the cells and means for supporting them during slate use so that the base plate embossings remain below the web plate and do not project into web plate apertures to avoid accidental embossing of the paper when the slate is closed on the paper, the paper to be embossed being received only between the web plate and the base plate with the web plate insuring accurate embossing of the paper.

2. The construction according to claim 1 wherein said web plate and guide plate are integrated to form a unitary structure.

References Cited

UNITED STATES PATENTS

| | | | |
|---|---|---|---|
| 2,823,468 | 2/1958 | Mora | 35—38 |
| 2,850,812 | 9/1958 | Mannheimer | 35—38 |

EUGENE R. CAPOZIO, *Primary Examiner.*

W. GRIEB, *Assistant Examiner.*

UNITED STATES PATENT OFFICE
CERTIFICATE OF CORRECTION

Patent No. 3,340,625                            September 12, 1967

Michael C. Supitilov

It is hereby certified that error appears in the above numbered patent requiring correction and that the said Letters Patent should read as corrected below.

In the heading to the printed specification, line 4, for "a corporation of Illinois" read -- a corporation of Delaware --.

Signed and sealed this 5th day of November 1968.

SEAL)

Attest:

Edward M. Fletcher, Jr.                            EDWARD J. BRENNER

Attesting Officer                                                 Commissioner of Patents